(12) United States Patent
Amraly et al.

(10) Patent No.: US 8,322,647 B2
(45) Date of Patent: Dec. 4, 2012

(54) HIGH TORQUE AERIAL LIFT (HTAL)

(75) Inventors: Stefan Amraly, New York, NY (US);
Paul Vasilescu, Bethesda, MD (US);
Daniel Turek, North Arlington, NJ (US)

(73) Assignee: American Dynamics Flight Systems, Inc., Calverton, NY (US)

( * ) Notice: Subject to any disclaimer, the term of this patent is extended or adjusted under 35 U.S.C. 154(b) by 284 days.

(21) Appl. No.: 12/438,528

(22) PCT Filed: Aug. 24, 2007
(Under 37 CFR 1.47)

(86) PCT No.: PCT/US2007/076754
§ 371 (c)(1),
(2), (4) Date: Feb. 22, 2011

(87) PCT Pub. No.: WO2008/105923
PCT Pub. Date: Sep. 4, 2008

(65) Prior Publication Data
US 2011/0284684 A1 Nov. 24, 2011

Related U.S. Application Data

(60) Provisional application No. 60/839,774, filed on Aug. 24, 2006, provisional application No. 60/954,684, filed on Aug. 8, 2007, provisional application No. 60/954,685, filed on Aug. 8, 2007.

(51) Int. Cl.
*B64C 15/12* (2006.01)
(52) U.S. Cl. ..................... 244/12.4; 244/23 A
(58) Field of Classification Search .................. 244/7 C, 244/12.3, 12.4, 56
See application file for complete search history.

(56) References Cited

U.S. PATENT DOCUMENTS

| | | |
|---|---|---|
| 3,029,048 A | 4/1962 | Brooks et al. |
| 3,972,490 A | 8/1976 | Zimmermann et al. |
| 4,071,207 A | 1/1978 | Piasecki et al. |
| 5,086,993 A | 2/1992 | Wainfan |
| 5,115,996 A | 5/1992 | Moller |
| 5,275,306 A | 1/1994 | Demoss |
| 5,368,256 A | 11/1994 | Kalisz et al. |
| 5,758,844 A | 6/1998 | Cummings |
| 5,823,468 A | 10/1998 | Bothe |
| 5,839,691 A | 11/1998 | Lariviere |
| 5,863,013 A | 1/1999 | Schmittle |
| 6,343,768 B1 | 2/2002 | Muldoon |
| 6,719,244 B1 * | 4/2004 | Gress ........................... 244/7 R |
| 2002/0074452 A1 | 6/2002 | Ingram |
| 2003/0006339 A1 | 1/2003 | Capanna |
| 2003/0080242 A1 * | 5/2003 | Kawai .......................... 244/12.4 |
| 2006/0016930 A1 * | 1/2006 | Pak .............................. 244/12.4 |

* cited by examiner

*Primary Examiner* — Christopher P Ellis
*Assistant Examiner* — Medhat Badawi
(74) *Attorney, Agent, or Firm* — Baker Botts LLP

(57) ABSTRACT

An aircraft includes a housing and a powerplant coupled to the housing and configured to rotate a drive shaft around its longitudinal axis. The aircraft may include at least one lift fan assembly coupled to its housing and including a gearbox and at least one lift fan. The gearbox is coupled to the drive shaft and configured to transfer rotational energy from the drive shaft to the lift fan or fans. The lift fan assembly or assemblies may include at least two pivot assemblies, the first pivot assembly configured to pivot the lift fan assembly on a first axis and the second pivot assembly configured to pivot the lift fan assembly on a second axis that is substantially perpendicular to the first axis.

30 Claims, 28 Drawing Sheets

HIGH TORQUE AERIAL LIFT (HTAL)

CROSS REFERENCE TO RELATED APPLICATIONS

This application is a national phase of International Application PCT/US07/076754, filed Aug. 24, 2007, which claims priority to U.S. Provisional Patent Application Ser. Nos. 60/839,774, filed on Aug. 24, 2006, 60/954,684, and 60/954,685, both filed on Aug. 8, 2007, each of which are incorporated by reference herein and from which priority is claimed.

BACKGROUND

1. Technical Field

The disclosed subject matter relates to aircraft propulsion systems and, more particularly, to a vertical take-off and landing (VTOL) propulsion system for aircraft. The disclosed subject matter further relates to airframe designs and, more particularly, to airframe designs for a vertical take-off and landing (VTOL) propulsion system for aircraft.

2. Background Technology

There are a variety of existing vertical take-off and landing ("VTOL") aircraft in use today. For example, helicopters are VTOL aircraft. However, because of its retreating blade and its basic construction the forward flight speed and efficiency of a conventional helicopter is significantly inferior to that of a conventional fixed wing aircraft. Additionally, the complexity of the helicopter's mechanical linkages contributes significantly to the crafts high cost and demanding maintenance requirements.

More recent efforts to improve the forward flight speed of vertical take-off and land aircraft are geared toward articulating rotors and/or wings or other toward other means of vectoring thrust. For example, the V-22 Osprey is a twin rotor helicopter with rotors that tilt forward. Additionally, for example the Harrier AV 8A accomplishes vertical and horizontal thrust by articulating movable nozzles, which are used to vector the thrust from its turbofan engines. Other efforts include Bollinger in U.S. Pat. No. 5,275,306 dated Jan. 4, 1994, who describes an aircraft with a horizontal lift fan driven by exhaust air. Zimmerman in U.S. Pat. No. 3,972,490 dated Aug. 3, 1994 describes a tri-fan powered VTOL aircraft that uses turbo-fans and has a horizontal lift fan in the nose of the aircraft. Other examples of this type of aircraft include the Bell XV-3, the Curtis-Wright X-100 and the Curtis-Wright X-19, U.S. Pat. No. 6,343,768 by Muldoon, U.S. Pat. No. 5,839,691 by Lariviere, and U.S. Pat. Application Pub. No. 2003/0080242 by Kawai.

The tilt rotor aircraft designs mentioned above attempt to combine the forward flight dynamics of a fixed wing aircraft with the vertical take off and landing capabilities of a helicopter. However, tilt rotor aircraft have several distinctive drawbacks. The first notable drawback is that tilt rotor aircraft must overcome negative angular moments created by tilting their spinning rotors 90 degrees during VTOL transitions. These angular moments produce a nose up force when transitioning from vertical to horizontal flight and a nose down force when transitioning from horizontal to vertical flight. These forces create inherently unstable conditions during the transitions between vertical and horizontal flight and visa versa. In actual practice, this inherent instability has been largely responsible for a poor safety record for this type of aircraft.

A second drawback of the tilt rotor design is the fact that if the propulsion rotation system should fail the craft is rendered incapable of landing as a conventional fixed wing aircraft. This occurs because the rotors are so large that they would strike the ground if the aircraft were to be landed like a conventional fixed wing aircraft, with the propellers spinning on a horizontal axis. For example, ducted fan aircraft such as the X-22, the design of the NORD 500 and the Doak 16 reduced the swept area of the propulsion system and allowed the aircraft to take off and land horizontally.

High velocity vectored thrust aircraft like the previously mentioned Harrier jet as well aircraft like those shown in U.S. Pat. No. 5,115,996 by Moller and U.S. Pat. No. 4,071,207 by Piasecki all suffer from at least four drawbacks. First, since vertical and horizontal thrust are controlled by vectoring a common air stream the vertical thrust and horizontal thrust cannot be controlled independently. This interdependence causes control and stability issues during VTOL transitions. Second, since thrust is gained by vectoring high velocity air, the high velocity air stream will kick up any loose objects in its immediate proximity during take off and landing. This phenomenon can pose a hazard to the aircraft and to ground personal. Third, since high velocity air is used to generate the lifting thrust, more power is required for vertical take off and landing than would be for an aircraft that generates its thrust over a larger area with a slower velocity air stream (i.e. a helicopter). Because of this, not only must the aircraft power plant be capable of supplying the required additional power, but the large amount of fuel used during take off and land negatively affects the aircraft's effective range and flight time. Fourth, vectored thrust aircraft whose thrust jets are located in close proximity to one another do not provide a wide and stable "base" for the aircraft to balance on and are inherently unstable in hover.

Another type of fixed wing VTOL aircraft is the tail setter. Tail setters rest on their tails and take off and land vertically, rotating the entire craft by 90 degrees to enter and exit forward flight. As with the tilt rotor aircraft, the lack of aerodynamic lift and the negative angular moment caused by tilting the craft with its spinning rotors causes significant instability issues when transitioning between vertical and horizontal flight and visa versa. Additionally, for piloted aircraft, the tail setter provides the pilot with limited situational awareness during VTOL transitions and hover. Examples of tail setter aircraft include, U.S. Pat. Application Pub. No. 2002/0074452 by Ingram, U.S. Pat. No. 5,863,013 by Schmittle, U.S. Pat. No. 5,758,844 by Cummings, U.S. Pat. No. 5,086,993 by Wainfan, U.S. Pat. Application Pub. No. 2002/0074452 by Ingram, and U.S. Pat. Application Pub. No. 2003/0006339 by Capanna.

Still another type of fixed wing VTOL aircraft employs vertically oriented ducted fans or jets in the in the wing of the craft. This type of aircraft typically suffers from several drawbacks. First, if the craft has only a few small fans, high velocity air is required for sufficient thrust thus resulting in the hazards and inefficiencies previously noted for the vectored thrust aircraft. If, however, the fan area is large the area taken by the fans will significantly impair the ability of the wing to develop lift during the transition time, when maximum lift is most needed. Furthermore, if the openings are large, they must be shuttered with louvers in order to reduce the induced drag of the opening during forward flight. This requirement for shuttering the fans during VTOL transitions adds further complexities and instabilities to the aircraft, particularly when transitioning from vertical to horizontal flight and visa-versa. Another drawback of the fan-in-wing aircraft is that the wings must be thicker than normal in order to house the ducted fans and their associated power transmission or power generation components. The drag induced by the thicker wing geometry will limit forward flight speed and efficiency.

Accordingly, there is a need for a vertical take-off and landing propulsion system for aircraft that does not suffer from the drawbacks of current systems.

SUMMARY

The accompanying drawings, which are incorporated and constitute part of this disclosure, illustrate embodiments of the disclosed subject matter and serve to explain its principles.

The disclosed subject matter provides aircraft. The aircraft may include a housing, an input drive shaft, and a powerplant coupled to the housing and configured to rotate the input drive shaft around its longitudinal axis.

The aircraft may include at least one lift fan assembly coupled to the housing. Each lift fan assembly includes a gearbox and at least one lift fan coupled to the gearbox. The input drive shaft is also coupled to the gearbox, and the gearbox is configured to transfer rotational energy from the input drive shaft to the lift fan.

The aircraft may include at least two pivot assemblies. The first pivot assembly is configured to pivot the lift fan assembly on a first axis and the second pivot assembly is configured to pivot the lift fan assembly on a second axis that is substantially perpendicular to the first axis.

In some embodiments of the disclosed subject matter the aircraft housing includes a fuselage, and two wings attached to opposite sides of the fuselage.

In some embodiments of the disclosed subject matter the aircraft includes exactly one lift fan assembly coupled to the fuselage.

In some embodiments of the disclosed subject matter, the aircraft includes two lift fan assemblies, each coupled to a wing of the aircraft.

In some embodiments of the disclosed subject matter each lift fan assembly includes two lift fans configured to counter-rotate.

In some embodiments of the disclosed subject matter, the aircraft includes a powerplant that is one of a turboshaft engine, a turboprop engine, a turbofan engine and an internal combustion engine.

In some embodiments of the disclosed subject matter the aircraft is configured for vertical take off and landing.

In some embodiments of the disclosed subject matter the aircraft is configured for short take off and vertical landing.

In some embodiments of the disclosed subject matter the aircraft is configured for short take off and landing.

In some embodiments of the disclosed subject matter the gearbox includes an outer enclosure, an output drive shaft coupled to the at least one lift fan, and a gearbox assembly within the outer enclosure that is coupled to the input drive shaft and configured to transfer rotational force from the input drive shaft to the output drive shaft.

In some embodiments of the disclosed subject matter the lift fan assembly includes a duct coupled to the input drive shaft and configured to enclose the lift fan assembly, and the two pivot assemblies are coupled to the outside of the duct.

In some embodiments of the disclosed subject matter the aircraft includes an output drive shaft coupled to the lift fan and the output drive shaft is entirely enclosed within the gearbox.

Figure 1:
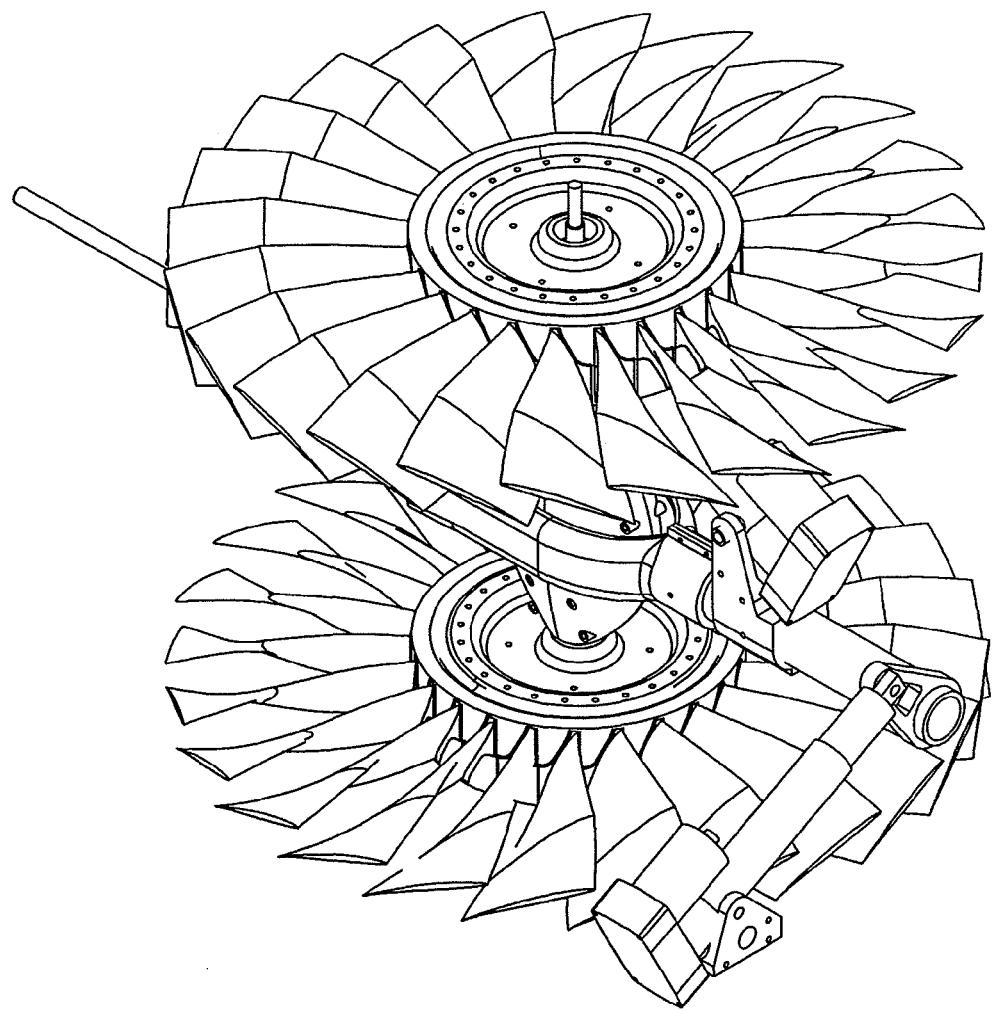
FIG. 1 is a top-right edge view of a two-fan embodiment of the disclosed subject matter.

Throughout the drawings, the same reference numerals and characters, unless otherwise stated, are used to denote like features, elements, components or portions of the illustrated embodiments. Moreover, while the disclosed subject matter will now be described in detail with reference to the FIGS., it is done so in connection with the illustrative embodiments.

DETAILED DESCRIPTION

Reference will now be made in detail to embodiments of the disclosed subject matter, examples of which are illustrated in the accompanying drawings.

Figure 10:
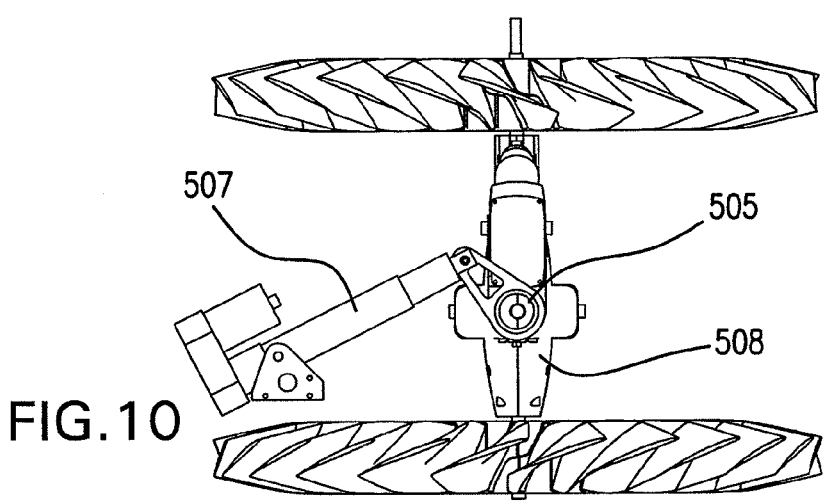
FIG. 10 is a front edge view of a two-fan embodiment of the disclosed subject matter with a 0 degree pivot.
Figure 11:
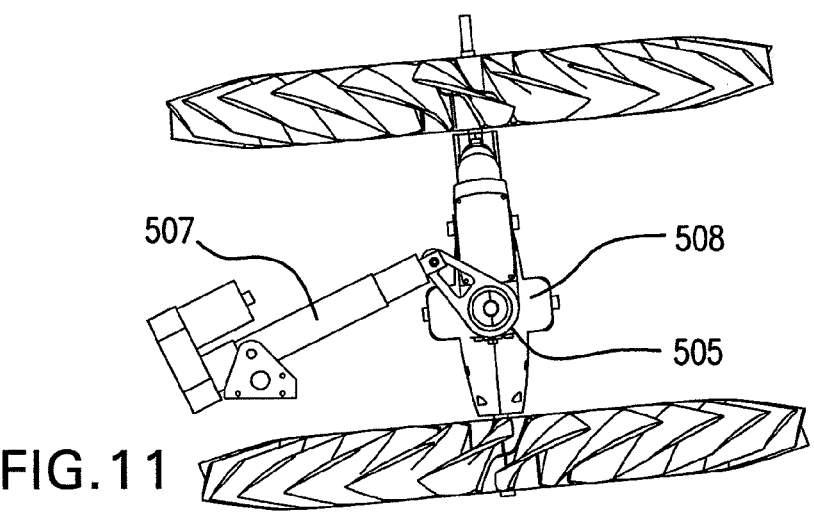
FIG. 11 is a front edge view of a two-fan embodiment of the disclosed subject matter with a 5 degree right pivot.
Figure 12:
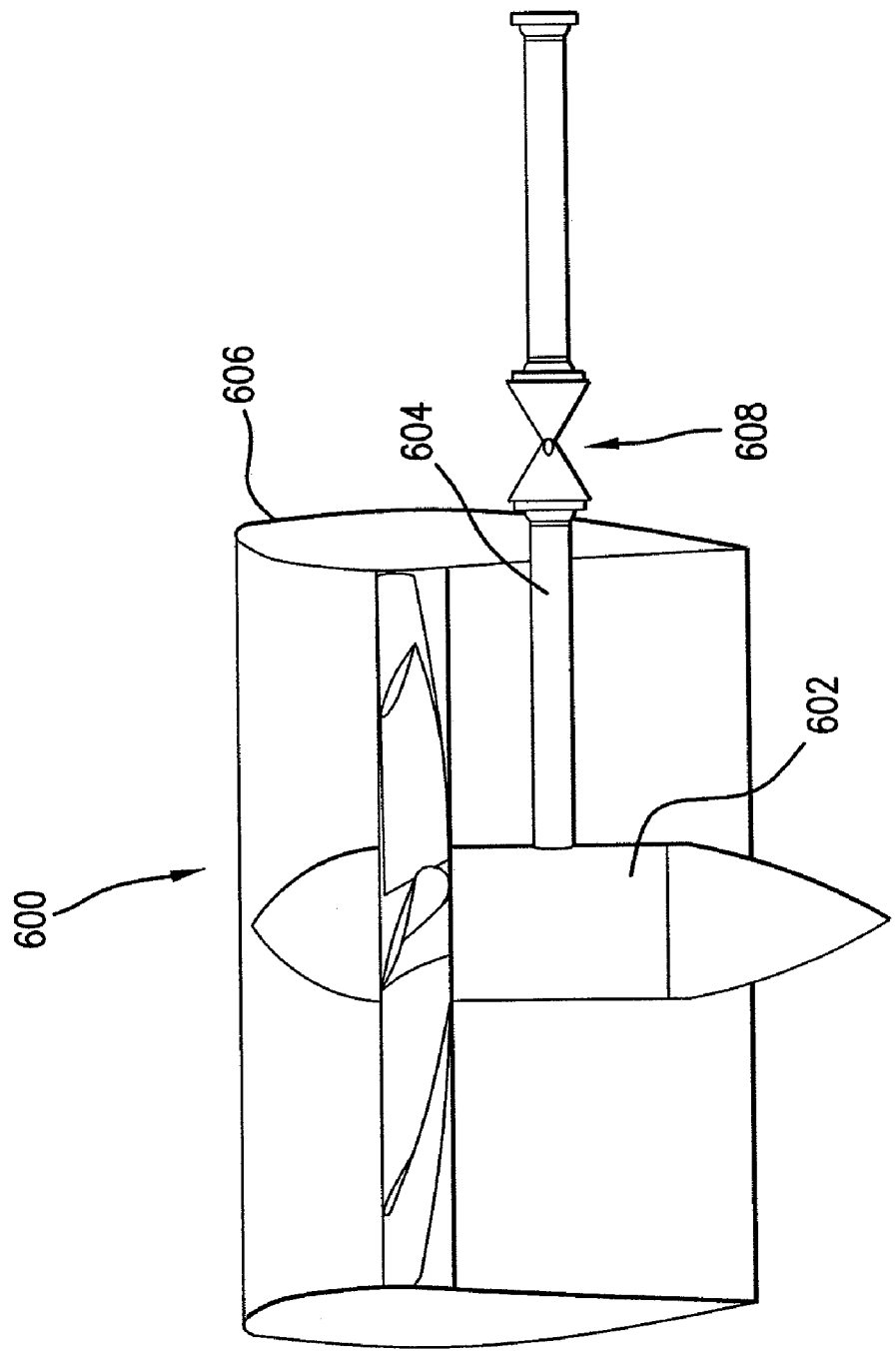
FIG. 12 is a side edge view of a one-fan embodiment of the disclosed subject matter.
Figure 13:
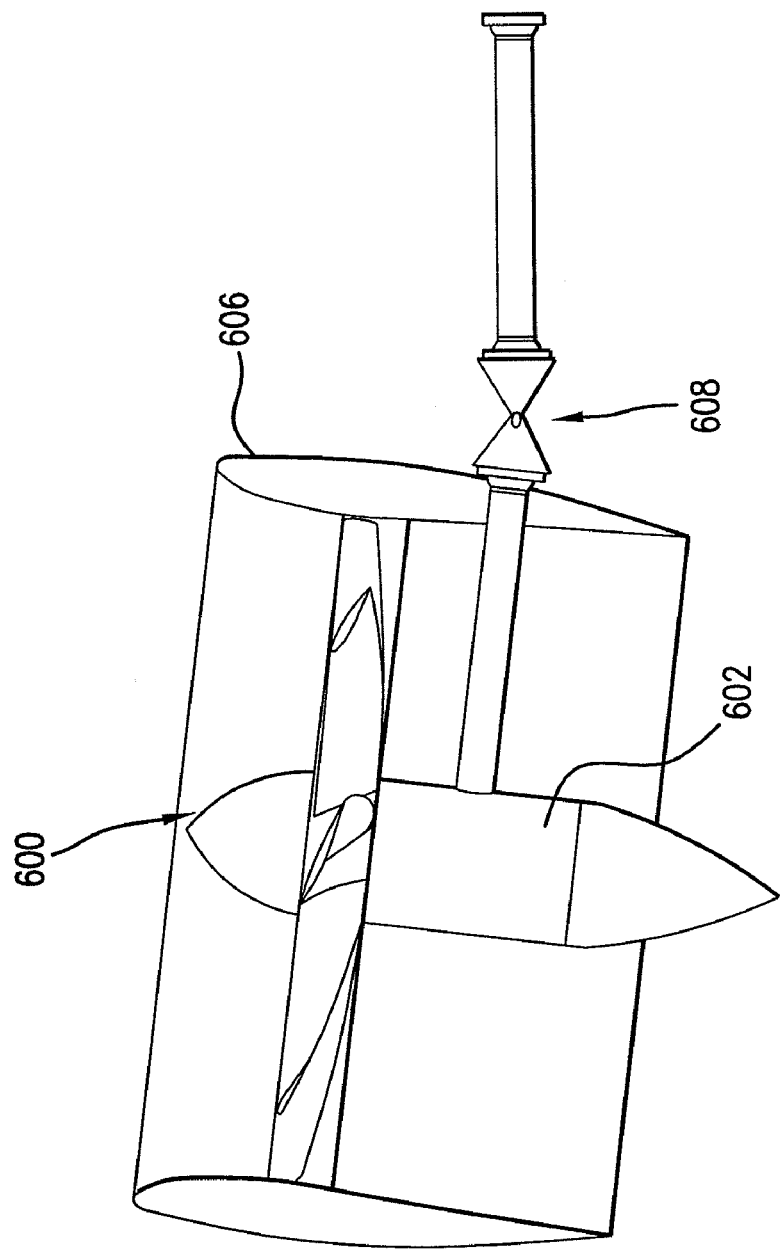
FIG. 13 is a side edge view of a one-fan embodiment of the disclosed subject matter pivoted at an angle.
Figure 14:
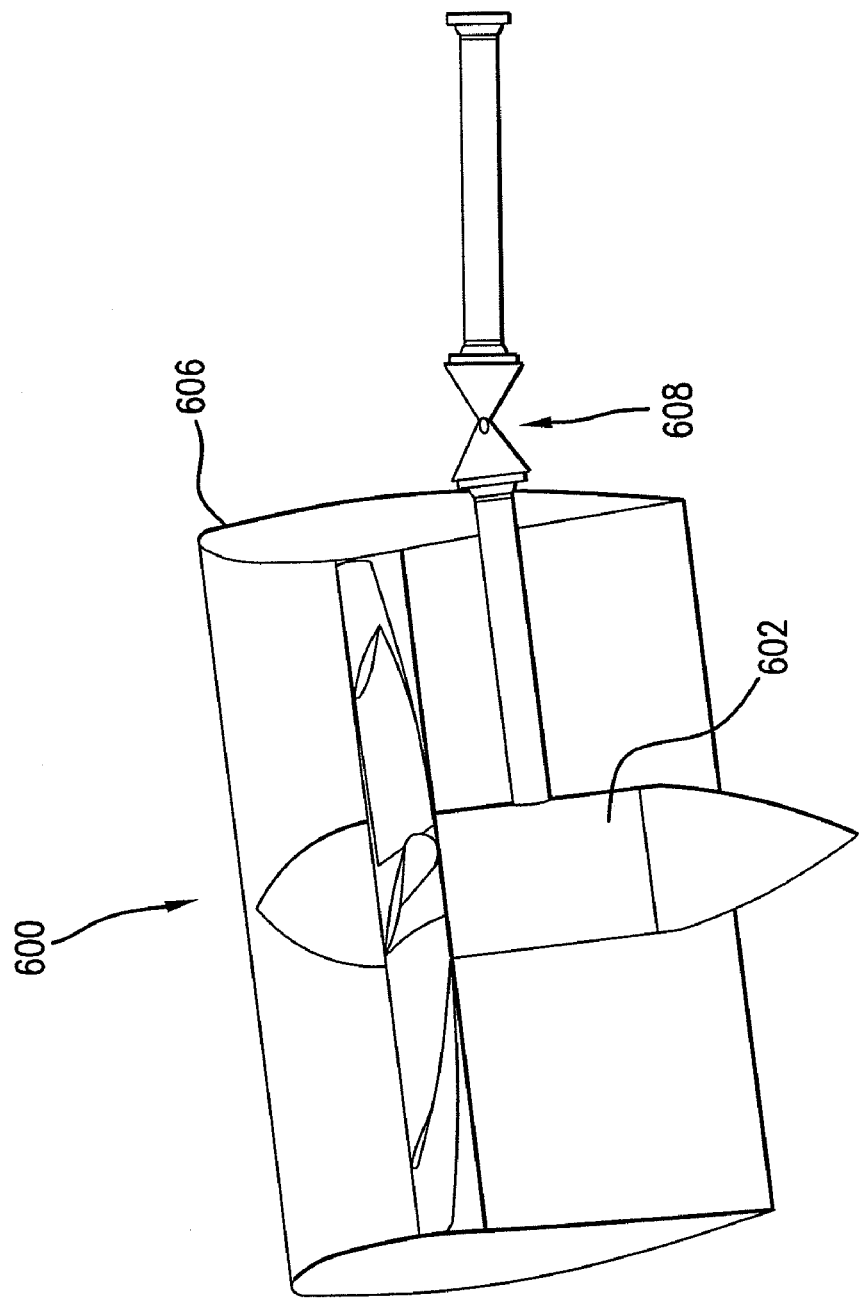
FIG. 14 is a side edge view of a one-fan embodiment of the disclosed subject matter pivoted at an angle.
Figure 15:
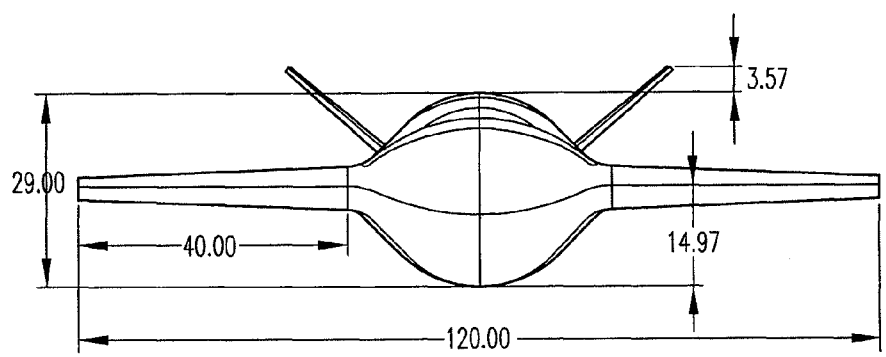
FIG. 15 is a front view of an airframe in accordance with an embodiment of the disclosed subject matter.
Figure 16:
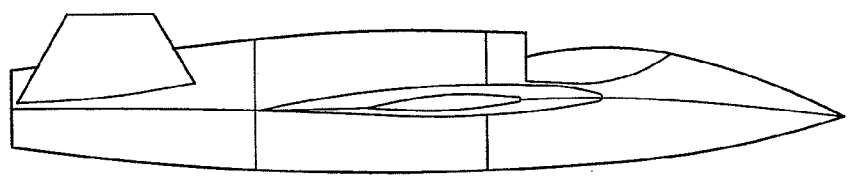
FIG. 16 is a side view of an airframe in accordance with the embodiment of FIG. 15.
Figure 17:
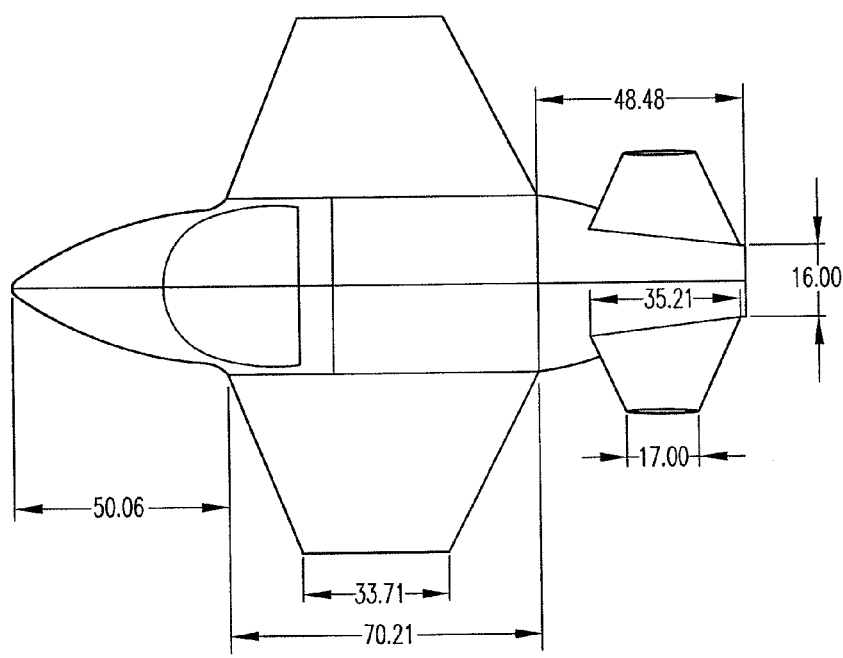
FIG. 17 is a top view of an airframe in accordance with the embodiment of FIG. 15.
Figure 18:
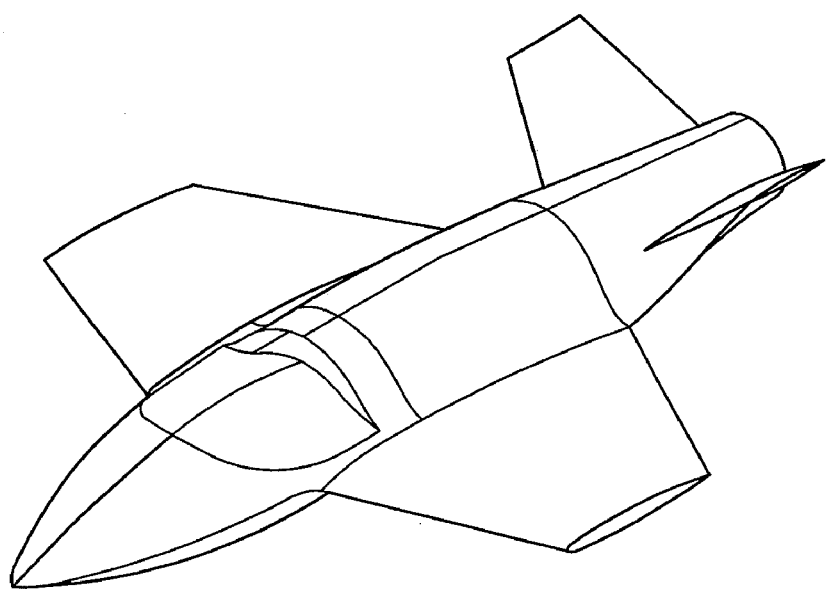
FIG. 18 is a perspective view of an airframe in accordance with the embodiment of FIG. 15.
Figure 19:
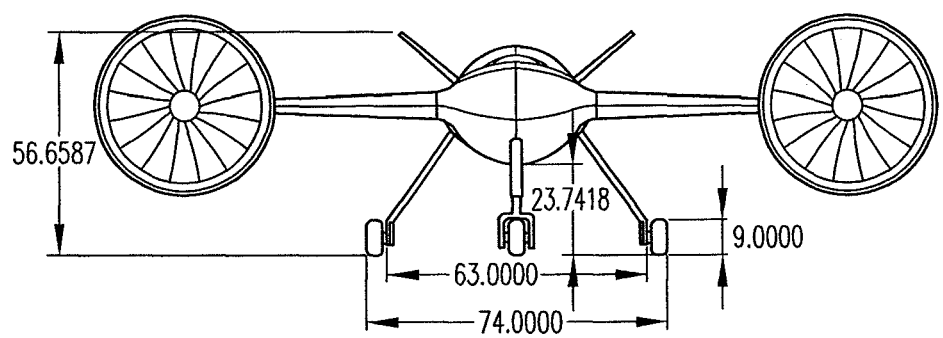
FIG. 19 is a front view of an airframe in accordance with an embodiment of the disclosed subject matter.
Figure 20:
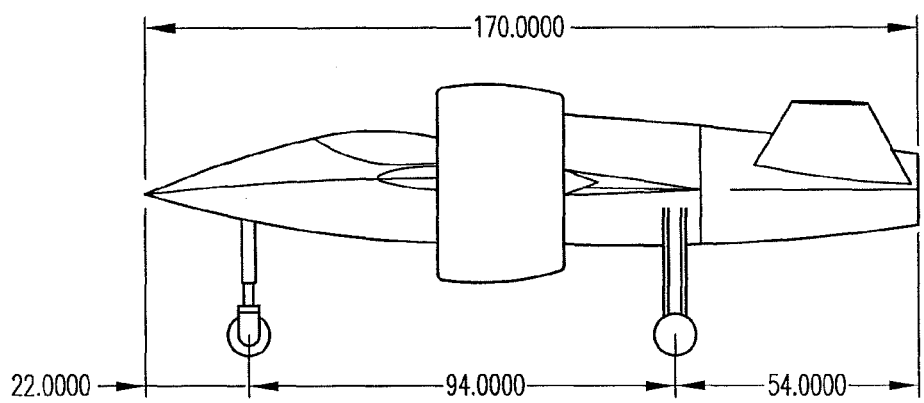
FIG. 20 is a side view of an airframe in accordance with the embodiment of FIG. 19.
Figure 21:
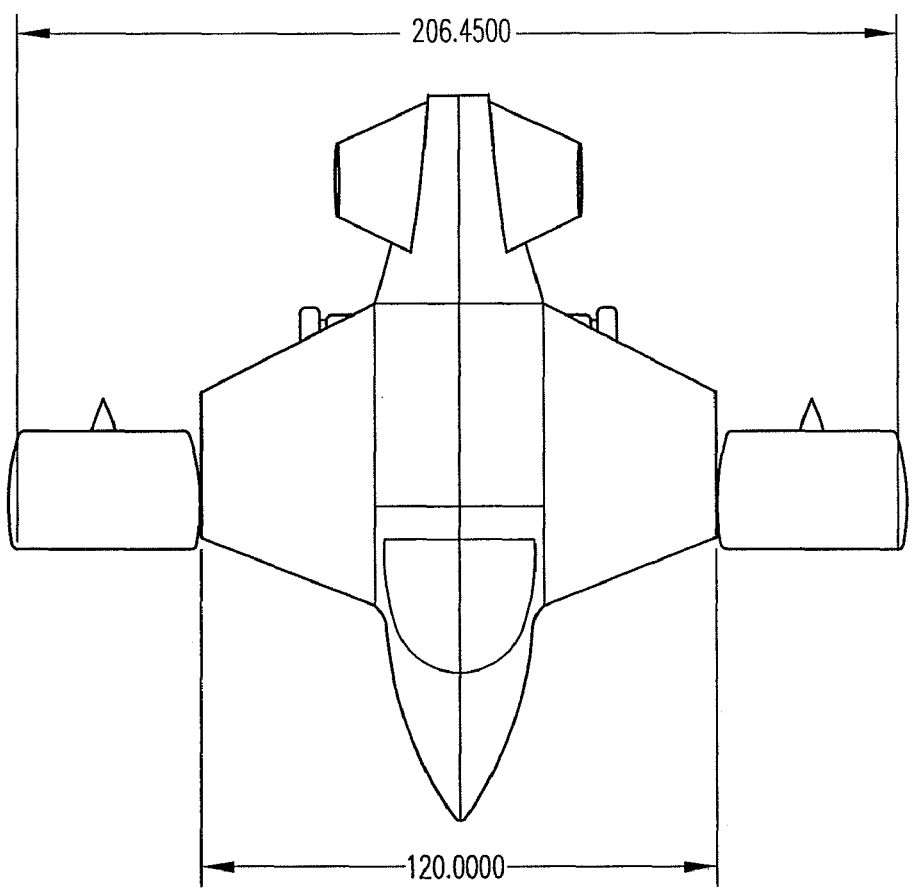
FIG. 21 is a top view of an airframe in accordance with the embodiment of FIG. 19.
Figure 22:
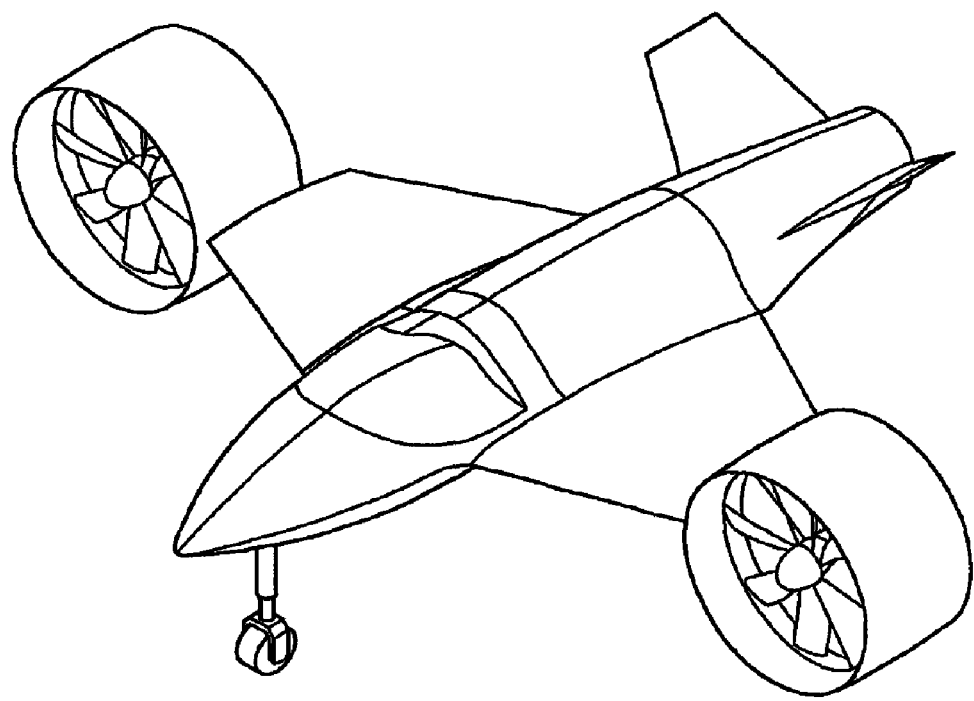
FIG. 22 is a perspective view of an airframe in accordance with the embodiment of FIG. 19.

FIGS. 1-11 represent a High Torque Aerial Lift (HTAL) system implementation integrating two counter-rotating lift fans into a single assembly. The depictions in FIGS. 12-14 are for HTAL implementations integrating a single lift fan in each assembly. The configuration of the gearbox, shaft, and pivot assemblies depicted in FIGS. 1-11 is equally valid for the single lift fan assembly depicted in FIGS. 12-14. Likewise, the configuration of the gearbox, shaft, and pivot assemblies depicted in FIGS. 12-14 is equally valid for the two-fan assembly depicted in FIGS. 1-11.

HTAL is a vertical lift and directional control system for aircraft platforms.

In one embodiment, an HTAL system includes one or more lift generating fans, such as lift fans, a central right angle gearbox, a set of assembly pivot brackets, a set of pivot shafts, a set of extruded roll support shafts, a set of linear or rotary actuators with supporting brackets, one or more output drive shafts, a set of input drive shafts, at least one universal joint, and a surrounding duct.

In the HTAL system, vertical lift can be achieved through the rotation of the input drive shaft, which causes the rotation of at least one, but typically two, counter-rotating lift fans arranged either into a single multi-stage assembly, or into two independent single stage assemblies. Lift force can be regulated by increasing or decreasing the RPM of the lift fan(s).

Directional control is achieved through the pivoting of the entire lift assembly, or assemblies, on two independent axis. The first pivot takes place along the axis of the pivot shafts and center of the universal joint. The second pivot takes place along the axis of the roll support shafts. The pivot motion may be executed through electric, hydraulic, electro-hydraulic, or virtually any other type of linear or rotary actuators as required by the particular HTAL implementation.

The HTAL system is shaft driven and may be powered by various turbine based powerplants, such as turboshaft, turboprop, and turbofan engines, internal combustion engines, and virtually any other type of powerplant that meets the power requirements (horsepower and RPM) for the particular HTAL implementation.

Depending on the particular configuration, HTAL may be implemented on Vertical Takeoff and Landing (VTOL), Short Takeoff and Vertical Landing (STOVL), Short Takeoff and Landing (STOL), and Conventional Takeoff and Landing (CTOL) aircraft platforms, both manned and unmanned.

Figure 2:
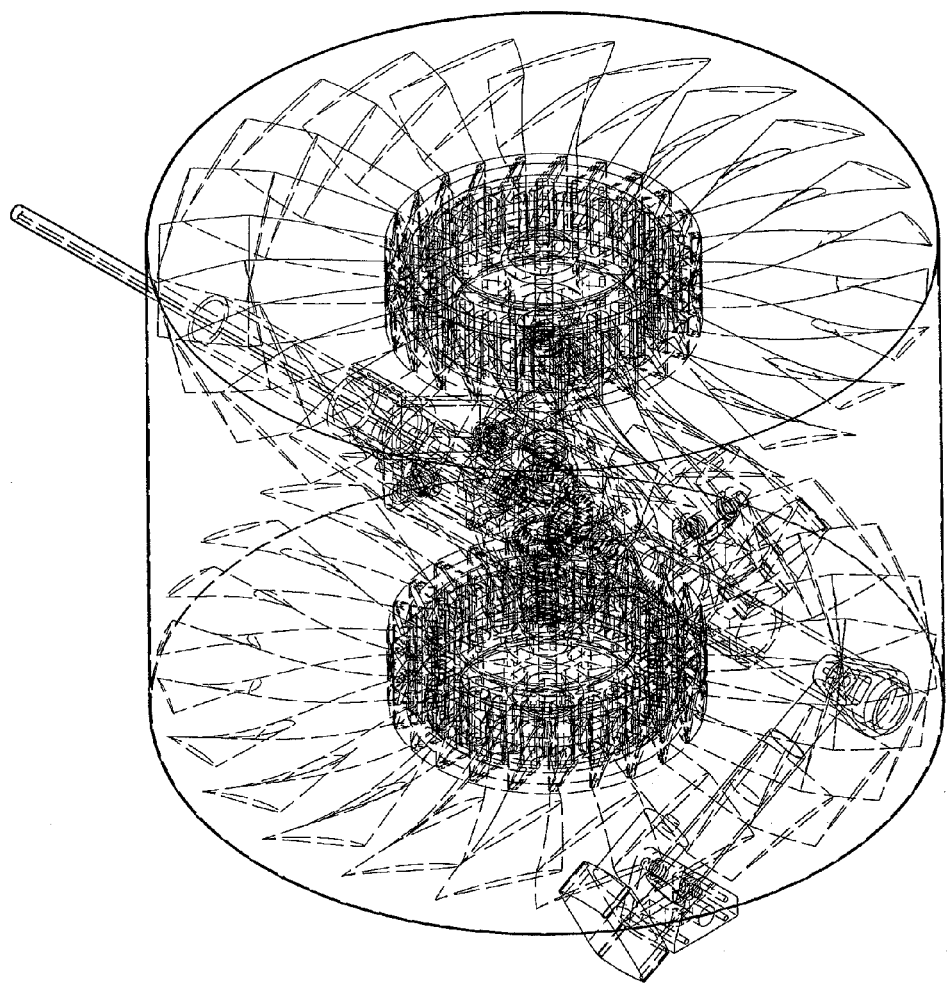
FIG. 2 is a top-right wire frame view of the embodiment of FIG. 1.

Referring to FIGS. 1 and 2, a vertical lift and directional control system for aircraft platforms in accordance with the disclosed subject matter is shown. HTAL provides the vertical lifting force and flight controls needed to cause an aircraft to either one, all, or in any combination, take off, hover, maintain steady forward flight, and land.

Figure 3:
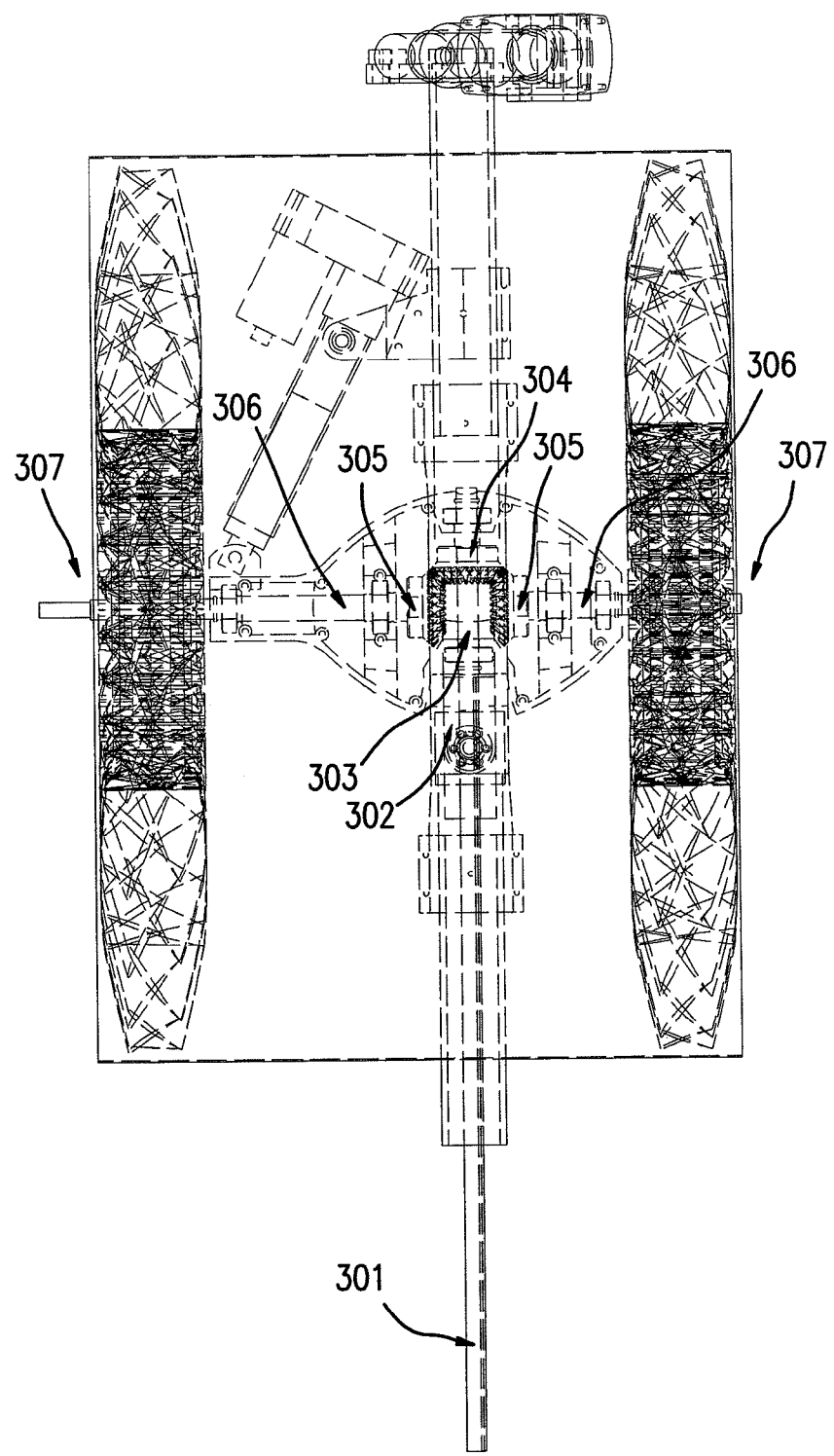
FIG. 3 is a side wire frame view of the embodiment of FIG. 1, which illustrates the HTAL power train.

FIG. 3 illustrates an exemplary power train for an HTAL implementation. Rotational force is applied to the input drive shaft 301, which then is transferred to the central right angle gearbox input shaft 303 through universal joint 302. The input miter or bevel gear 304 receives this rotational force and transfers it to the output miter or bevel gear(s) 305, which then transfers it to output shaft(s) 306, and lift fan(s) 307.

If the HTAL implementation integrates two lift fans into a single assembly, the configuration of the gear cluster of miter or bevel gear 304 and miter or bevel gears 305 causes the miter or bevel gears 305 to counter-rotate and as such, output shafts 306, and lift fans 307 counter-rotate as well.

The central gearbox input shaft 303, input miter or bevel gear 304, output miter or bevel gear(s) 305, and output shaft (s) 306 are all positioned within an enclosed central gearbox complete with bearings, bearing seats, and o-rings. The amount of lift generated by the HTAL implementation varies based on the RPM applied to the input drive shaft 301. Higher RPM translates into greater lifting force and likewise, lower RPM translates into less lifting force.

Figure 4:
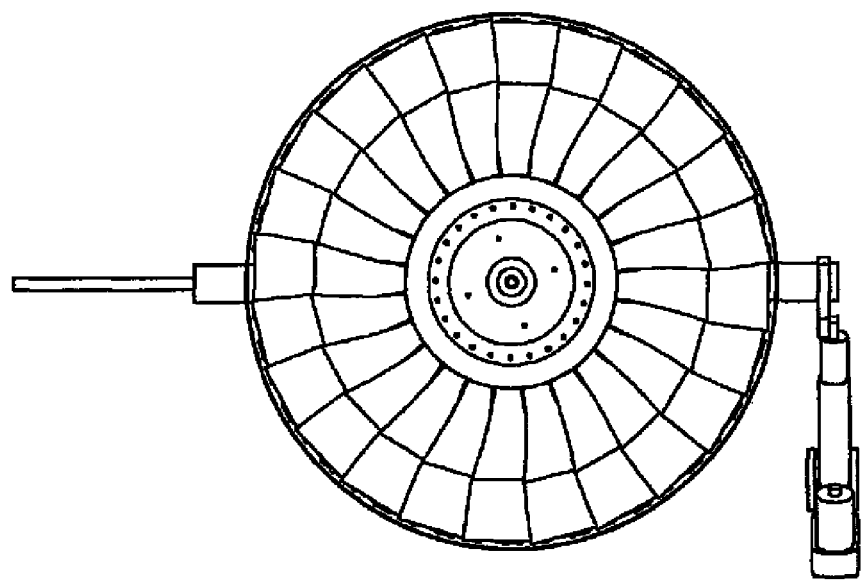
FIG. 4 is a top edge view of the embodiment of FIG. 1.
Figure 5:
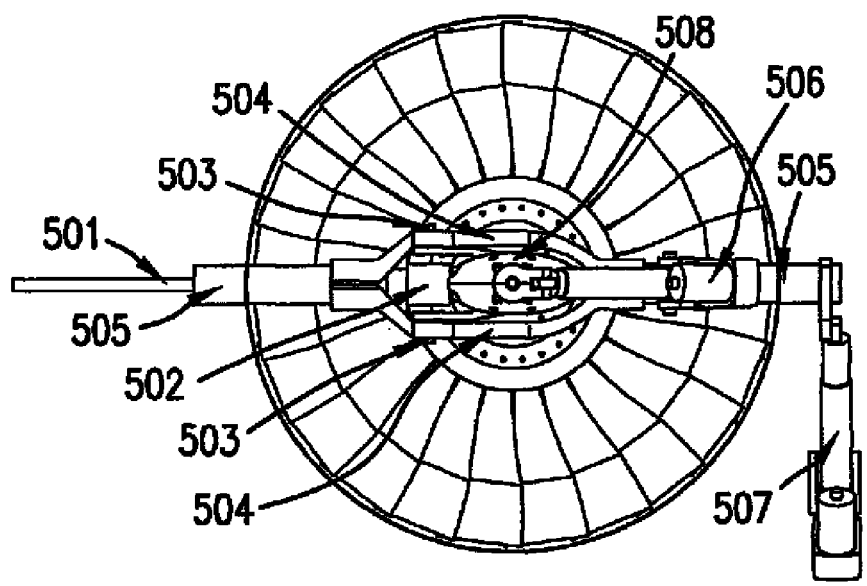
FIG. 5 is a top edge view of the embodiment of FIG. 1, which illustrates the HTAL flight control components.

FIGS. 4 and 5 illustrate and exemplary directional control components of an HTAL implementation. HTAL provides directional control by pivoting the entire lift assembly on two independent axis.

When the lift assembly is pivoted in any direction, air moving into the lift assembly is drawn from the direction of the pivot and air expelled from the lift assembly moves in the direction opposite of the pivot causing the aircraft in which the HTAL implementation exists to move in the direction of the pivot.

The first pivot takes place along the axis of the pivot shafts 503 and center of universal joint 502. The location of this defined axis may be anywhere along the input drive shaft 501, however it should be as close to the gear cluster in the center of the central gearbox 508 as permitted by the HTAL implementation. The second pivot takes place along the axis of the center of the roll support shafts 505.

The roll support shafts 505 are mechanically restrained to the airframe implementing the HTAL system but are able to pivot along their own central axis. These same roll support shafts are mechanically restrained to the pivot brackets 504. The pivot shafts 503 are able to pivot within the pivot brackets 504 and are mechanically restrained to the central gearbox 508. The linear actuator 506 is able to pivot within its seat in central gearbox 508 and its mount which is restrained to the roll support shaft 505. The linear actuator 507 is able to pivot within its own mount which is restrained to the airframe implementing the HTAL system, and a pull bracket which is restrained to the roll support shaft 505.

Figure 6:
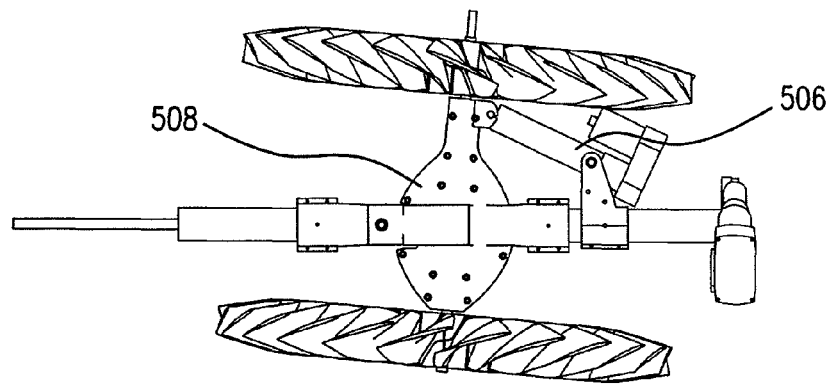
FIG. 6 is a side edge view of the a two-fan embodiment of the disclosed subject matter.
Figure 7:
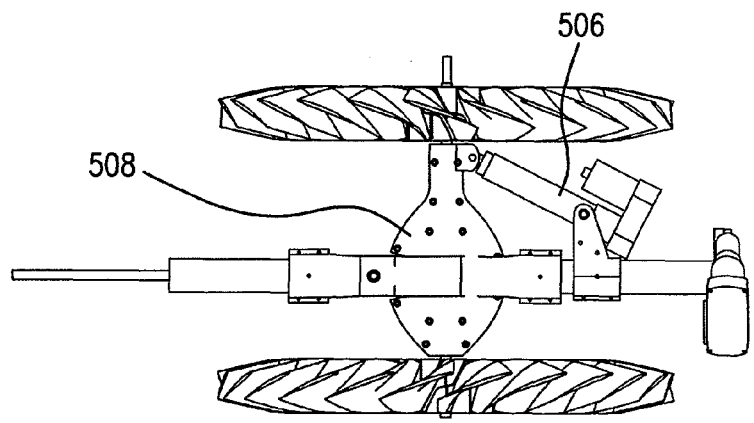
FIG. 7 is a side edge view of a two-fan embodiment of the disclosed subject matter with a 0 degree pivot.
Figure 8:
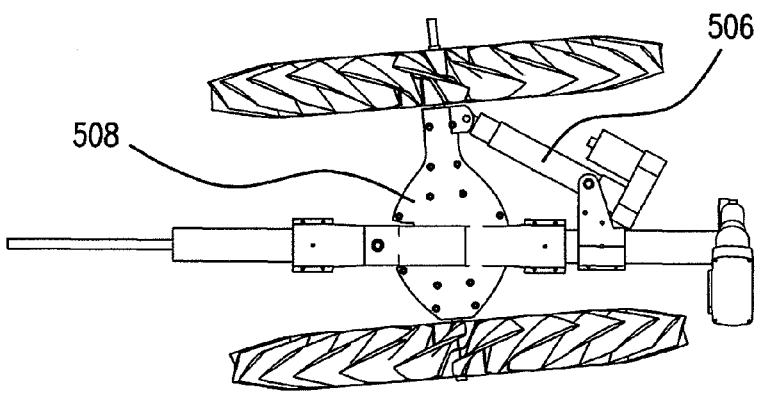
FIG. 8 is a side edge view of a two-fan embodiment of the disclosed subject matter with a 5 degree reverse pivot.
Figure 9:
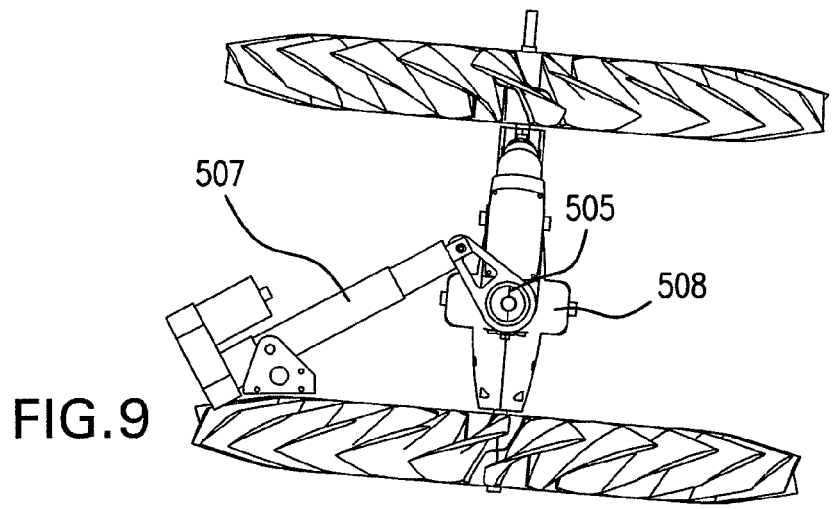
FIG. 9 is a front edge view of a two-fan embodiment of the disclosed subject matter with a 5 degree left pivot.

FIGS. 6-8 show the HTAL system in various positions. As shown in FIG. 7, when in its neutral position, linear actuator 506, causes a 0 degree pivot and as such does not cause any directional movement along the first axis. This scenario is illustrated in FIG. 7. Since the linear actuator 506 is mechanically restrained the roll support shaft 505 which in turn is restrained to the airframe implementing the HTAL system, whenever the linear actuator 506 retracts by any degree, it forces the central gearbox 508 to pivot towards the linear actuator 506 as illustrated in FIG. 6. Likewise whenever the linear actuator 506 extends by any degree, it forces the central gearbox 508 to pivot away from the linear actuator 506 as illustrated in FIG. 8. Referring next to FIGS. 9-11, when in its neutral position, linear actuator 507, causes a 0 degree pivot and as such does not cause any directional movement along the second axis, as is illustrated in FIG. 10. Since the linear actuator 507 is able to pivot within its own mount which is restrained to the airframe implementing the HTAL system, and a pull bracket which is restrained to the roll support shaft 505, whenever the linear actuator 507 extends by any degree, it forces the entire lift assembly, including the roll support shafts 505, pivot brackets 504, and central gearbox 508 to pivot along the axis of the roll support shafts 505, in the direction opposite to the linear actuator 507 as illustrated in FIG. 9. Likewise whenever the linear actuator 507 retracts by any degree, it forces the entire lift assembly, including the roll support shafts 505, pivot brackets 504, and central gearbox 508 to pivot along the axis of the roll support shafts 505, in the direction towards to the linear actuator 507 as illustrated in FIG. 11.

FIGS. 12-14 show a configuration of the gear assembly is shown which includes the output drive shaft entirely enclosed within a gearbox 602.

The central gearbox input shaft (not shown), input miter or bevel gear (not shown), output miter or bevel gear(s) (not shown), and output shaft(s) (not shown) are all positioned within an enclosed central gearbox 602 complete with bearings, bearing seats, and o-rings. The amount of lift generated by the HTAL implementation can be varied based on the RPM applied to input drive shaft 604. Higher RPM translates into greater lifting force and likewise, lower RPM translates into less lifting force.

FIGS. 12-14 show an embodiment of the disclosed subject matter in which the directional control elements of the lift fan assembly, such as the pivot shafts and joints used to control roll, pitch, and yaw, are all located outside of an enclosed duct 606 and out of the path of airflow created by the lift fan. For example, pivot joint 608 shown in FIGS. 12-14 is outside of duct 606. This configuration may be advantageous to decrease obstruction of the airflow from the lift fan as well as to decrease air flow disturbances that could be caused by the interaction of the airflow out of the fan and into components in the path of that airflow.

FIGS. 13 and 14 show an exemplary directional control components of an HTAL implementation having a single lift fan. HTAL provides directional control by pivoting the entire lift assembly on two independent axis.

When the lift assembly is pivoted in any direction, air moving into the lift assembly is drawn from the direction of the pivot and air expelled from the lift assembly moves in the direction opposite of the pivot causing the aircraft in which the HTAL implementation exists to move in the direction of the pivot.

In the embodiment illustrated in FIGS. 12-14, a first pivot control occurs co-axial with input drive shaft 604, allowing the entire duct and lift fan assembly to rotate along the axis of the input drive shaft. A second pivot control occurs at pivot joint 608, allowing duct 606 and lift fan assembly 600 to pivot. FIG. 12 show a neutral position in which lift fan assembly 600 is not pivoted along either the first pivot axis or the pivot joint 608. FIG. 13 show a pivot position in which duct 606 and lift fan assembly 600 are not pivoted along the first pivot axis but are tilted upwards by pivot joint 608. FIG. 14 show a pivot position in which duct 606 and lift fan assembly 600 are not pivoted along the first pivot axis but are tilted downwards by pivot joint 608.

Although figures represent airframes integrating HTAL VTOL lift fans having only a single fan in each assembly, integrating two counter-rotating lift fans into a single assembly is equally valid for the airframe designs.

FIGS. 15-18 show an airframe design in accordance with an embodiment of the disclosed subject matter.

FIGS. 19-22 show an airframe design in accordance with an embodiment of the disclosed subject matter incorporating an HTAL lift fan in each wing.

Figure 23:
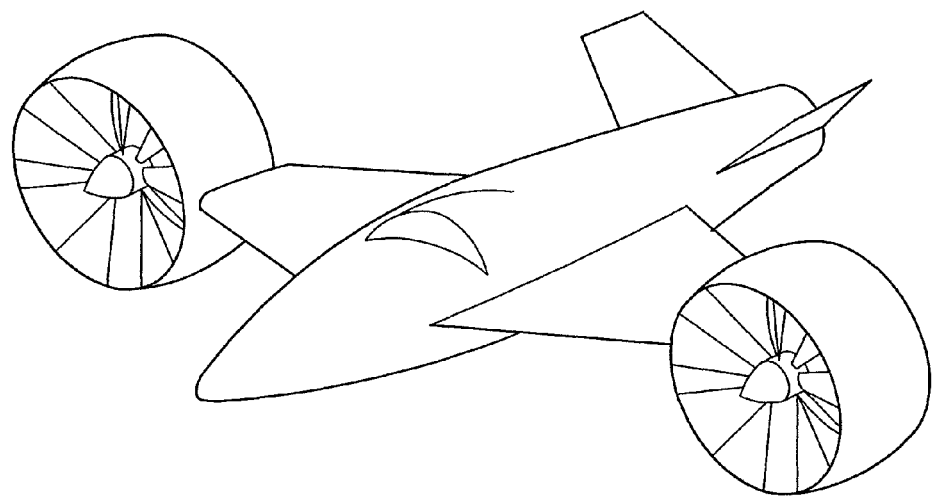
FIG. 23 is a perspective view of an airframe in accordance with the embodiment of FIG. 19 with the lift fan assemblies facing forward.
Figure 24:
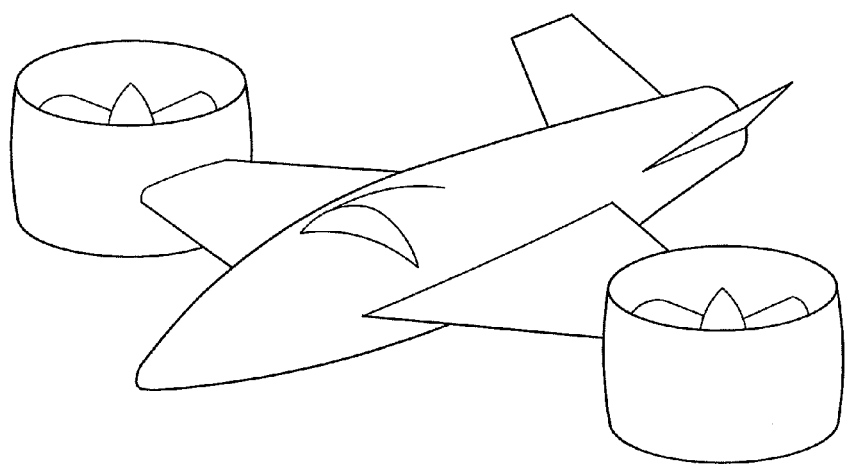
FIG. 24 is a top view of an airframe in accordance with the embodiment of FIG. 19 with the lift fan assemblies facing upward.
Figure 25:
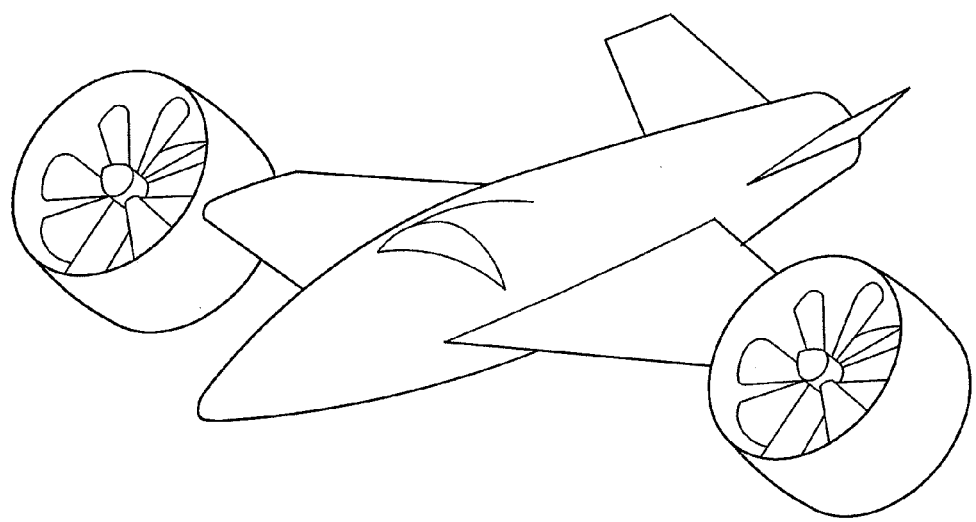
FIG. 25 is a perspective view of an airframe in accordance with the embodiment of FIG. 19 with the lift fan assemblies facing at an angle.

FIGS. 23-25 show an airframe design in accordance with an embodiment of the disclosed subject matter incorporating HTAL lift fans in each wing. The figures depict the airframe in perspective view with the lift fans tilted forward, upward, and at an angle, respectively, in FIGS. 23-25.

Figure 26:
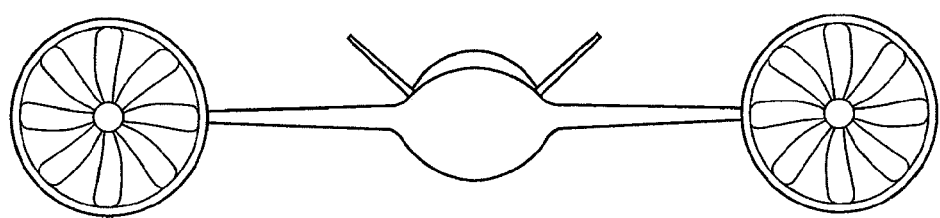
FIG. 26 is a front view of an airframe in accordance with the embodiment of FIG. 19 with the lift fan assemblies facing forward.
Figure 27:
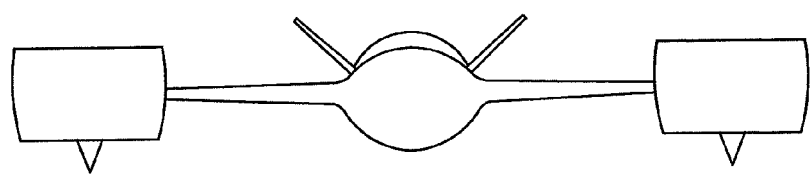
FIG. 27 is a front view of an airframe in accordance with the embodiment of FIG. 19 with the lift fan assemblies facing upward.
Figure 28:
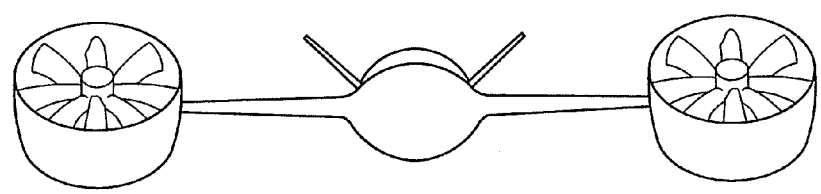
FIG. 28 is a front view of an airframe in accordance with the embodiment of FIG. 19 with the lift fan assemblies facing at an angle.

FIGS. 26-28 show an airframe design in accordance with an embodiment of the disclosed subject matter incorporating HTAL lift fans in each wing. The figures depict the airframe from a front view with the lift fans tilted forward, upward, and at an angle, respectively, in FIGS. 26-28.

Figure 29:
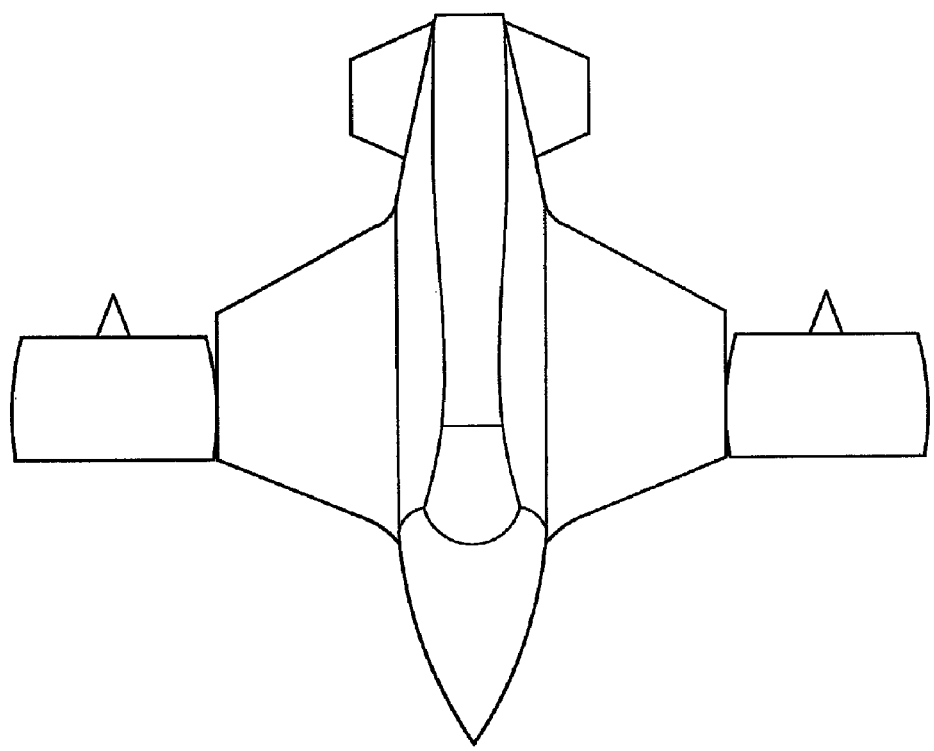
FIG. 29 is a top view of an airframe in accordance with the embodiment of FIG. 19 with the lift fan assemblies facing forward.
Figure 30:
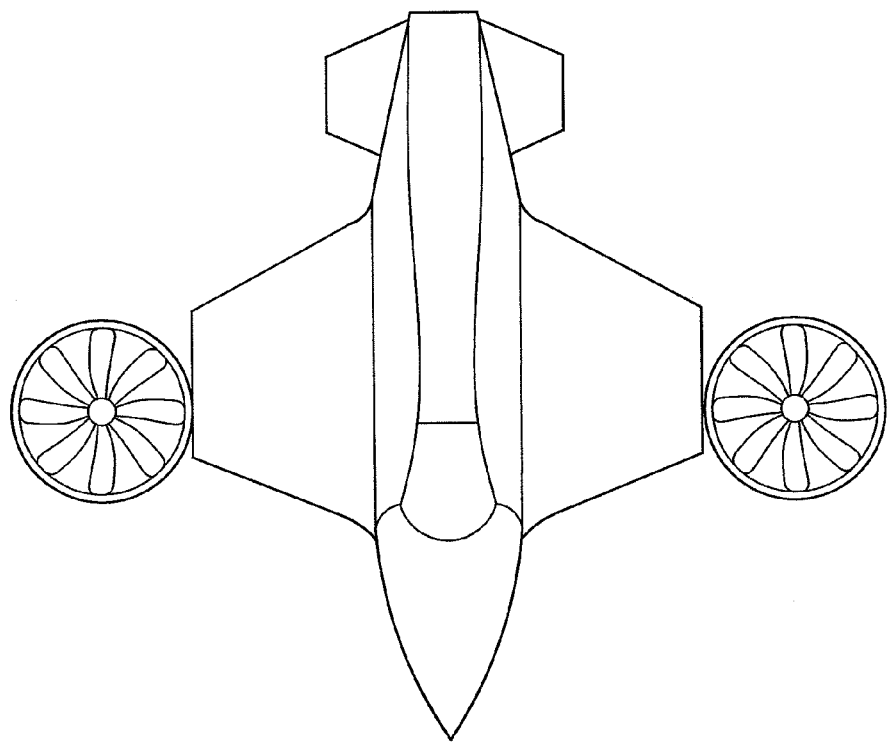
FIG. 30 is a top view of an airframe in accordance with the embodiment of FIG. 19 with the lift fan assemblies facing upward.
Figure 31:
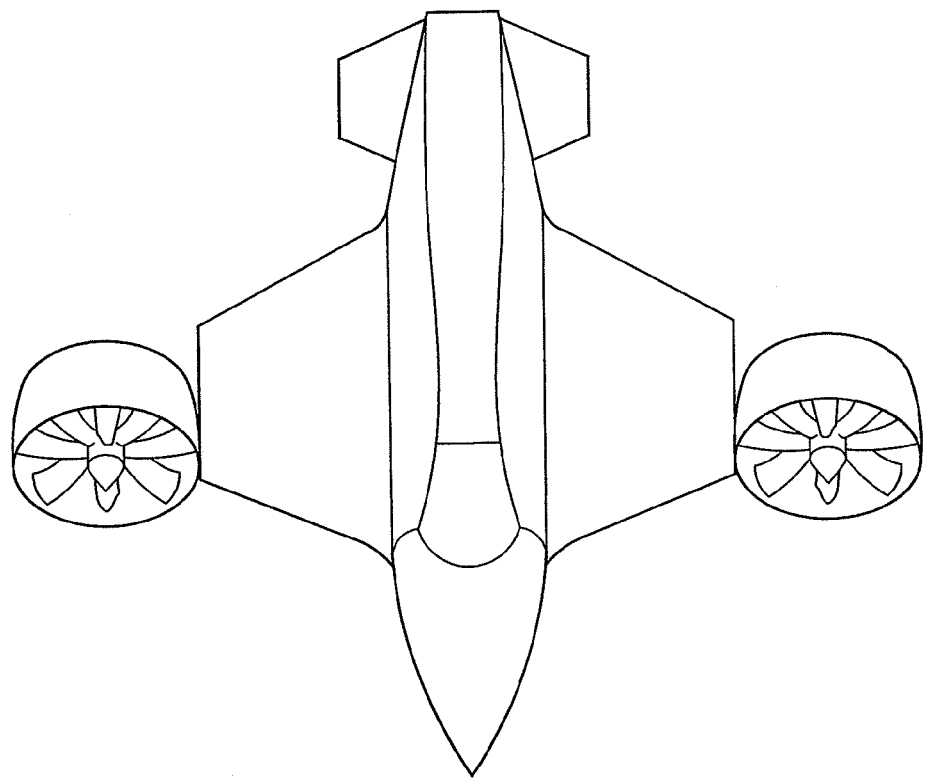
FIG. 31 is a top view of an airframe in accordance with the embodiment of FIG. 19 with the lift fan assemblies facing at an angle.

FIGS. 29-31 show an airframe design in accordance with an embodiment of the disclosed subject matter incorporating HTAL lift fans in each wing. The figures depict the airframe from a top perspective with the lift fans tilted forward, upward, and at an angle, respectively, in FIGS. 29-31. As shown in the embodiments illustrated in FIGS. 19-31, an HTAL lift fan is incorporated into the airframe at the wing tip.

Figure 32:
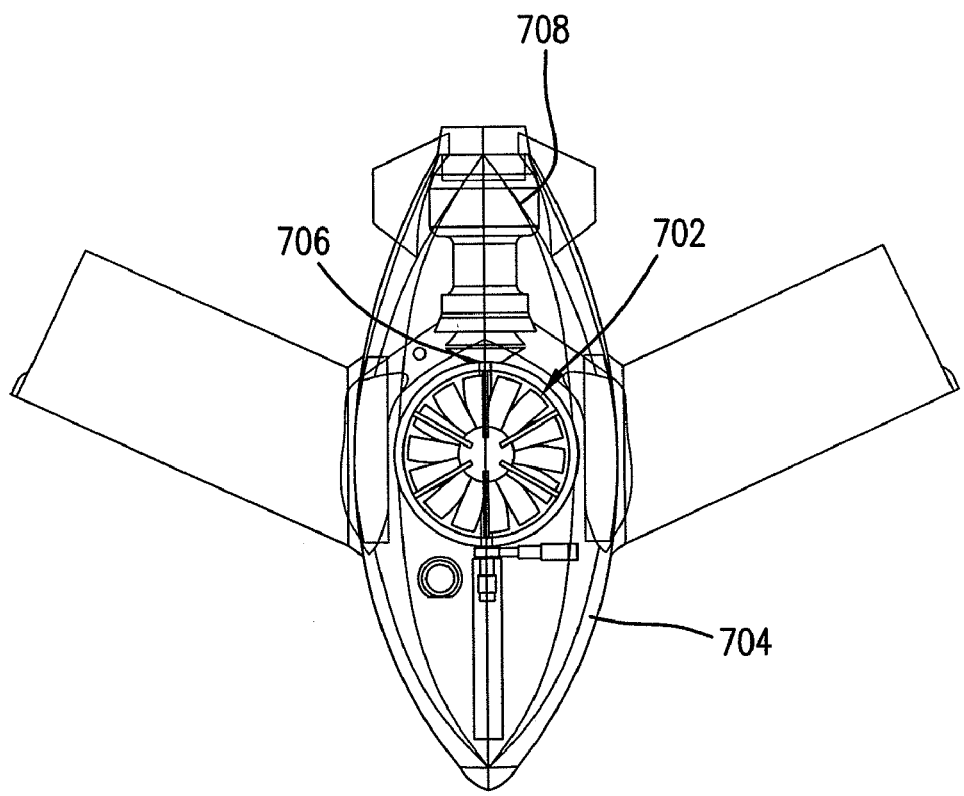
FIG. 32 is a top view line drawing of an aircraft in accordance with an embodiment of the disclosed subject matter.

FIG. 32 is a top view line drawing of an aircraft in accordance with an embodiment of the disclosed subject matter. As shown in FIG. 32, a single lift fan assembly 702 is incorporated into the fuselage 704 of the aircraft. An input drive shaft 706 is coupled to the powerplant 708 and is rotated about its longitudinal axis by the powerplant 708. The input drive shaft 706 is coupled to the lift fan assembly 702. The gearbox (not shown) is configured to transfer the rotational energy of the input drive shaft to the lift fan.

Figure 33:
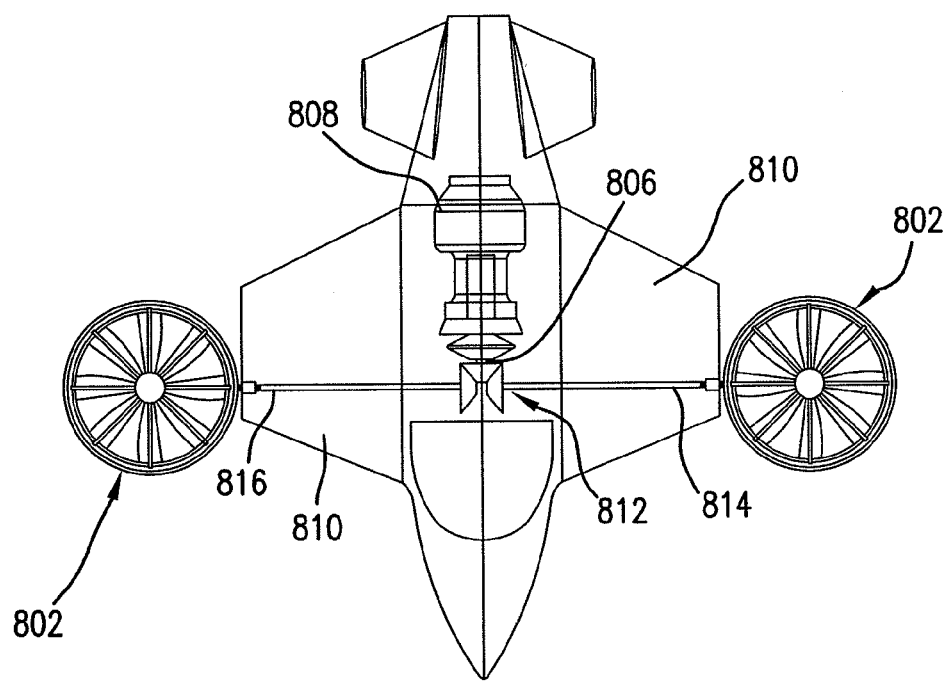
FIG. 33 is a top view line drawing of an aircraft in accordance with an embodiment of the disclosed subject matter.

FIG. 33 is a top view line drawing of an aircraft in accordance with an embodiment of the disclosed subject matter. FIG. 33 shows an aircraft having two lift fan assemblies 802, each located at the tip of wing 810 of the aircraft. In the dual lift fan assembly embodiment shown, input drive shaft 806 is coupled to powerplant 808 and is rotated about its longitudinal axis by powerplant 808. Input drive shaft 806 is coupled to lift fan assemblies 802 via gear assembly 812, which may be a single input gear, dual output gear, right angle gearbox located at the intersection of the aircraft's lateral and longitudinal axis. Gear assembly 812 is configured to transfer the rotational energy of input drive shaft 806 to lift fan assemblies 802 by counter-rotating two input shafts 814 and 816 about the lateral axis of the aircraft. The two input shafts 814 and 816 couple input drive shaft 806 to lift fan assemblies 802.

While the particular HTAL implementations and airframe designs as herein disclosed and shown through the figures is fully capable of obtaining the objects and providing the advantages of a HTAL system, it is merely illustrative of the embodiments of the disclosed subject matter, and as such, no limitations are intended to the details of construction or design herein shown.

It will be apparent to those skilled in the art that various modifications and variations can be made in the method and system of the disclosed subject matter without departing from the spirit or scope of the invention.

What is claimed is:

1. An aircraft comprising:
    an aircraft housing;
    an input drive shaft having a longitudinal axis;
    a powerplant coupled to the housing and configured to rotate the input drive shaft around the longitudinal axis thereof;
    at least two lift fan assemblies coupled to the aircraft housing, each including a gearbox and at least one lift fan coupled thereto, wherein the input drive shaft is coupled to the gearbox to transfer rotational energy thereto and wherein each fan assembly further includes a first actuator mounted on at least one of a support shaft or the aircraft housing and the first actuator including a linear actuator or a rotary actuator, and each fan assembly further includes a second actuator coupled to the support shaft and mounted to the aircraft housing, the second actuator includes a linear actuator or a rotary actuator; and at least two pivot assemblies for each of the at least two lift fan assemblies, including a first pivot assembly configured to pivot a lift fan assembly on a first axis by movement of the first actuator, and a second pivot assembly configured to pivot a lift fan assembly on a second axis substantially perpendicular to the first axis by the movement of the second actuator, wherein each lift fan assembly is pivoted independently on at least one axis.

2. The aircraft of claim 1, the aircraft housing comprising:
a fuselage;
a first wing attached to a side of the fuselage; and
a second wing attached to a side of the fuselage opposite the first wing.

3. The aircraft of claim 1, wherein the at least two lift fan assemblies are coupled to the aircraft housing.

4. The aircraft of claim 2, the at least two lift fan assemblies comprising:
a first lift fan assembly coupled to the first wing; and
a second lift fan assembly coupled to the second wing.

5. The aircraft of claim 1, the at least one lift fan comprising two lift fans configured to counter-rotate.

6. The aircraft of claim 1, wherein the powerplant is selected from one of: a turboshaft engine, a turboprop engine, a turbofan engine and an internal combustion engine.

7. The aircraft of claim 1, wherein the aircraft is configured for vertical take off and landing.

8. The aircraft of claim 1, wherein the aircraft is configured for short take off and vertical landing.

9. The aircraft of claim 1, wherein the aircraft is configured for short take off and landing.

10. The aircraft of claim 1, the gearbox comprising:
an outer enclosure;
an output drive shaft coupled to the at least one lift fan; and
a gearbox assembly within the outer enclosure coupled to the input drive shaft and configured to transfer rotational force of the input drive shaft to rotational force on the output drive shaft.

11. The aircraft of claim 1, each of the at least two lift fan assemblies further comprising:
a duct coupled to the input drive shaft and configured to enclose each of the at least two lift fan assemblies, the at least two pivot assemblies coupled to the outside of the duct.

12. The aircraft of claim 1, further comprising an output drive shaft coupled to the at least one lift fan.

13. The aircraft of claim 12, wherein the output drive shaft is entirely enclosed within the gearbox.

14. A pivotable lift fan assembly adapted for coupling to longitudinally rotatable input drive shaft of an aircraft, comprising:
at least one lift fan;
a gearbox coupled to the input drive shaft to transfer rotational energy therefrom, and coupled to the at least one lift fan;
a first actuator mounted on at least one of a support shaft of the aircraft or a housing of the aircraft; the first actuator including a linear actuator or a rotary actuator;
a second actuator coupled to the support shaft and mounted to the housing of the aircraft, the second actuator including a linear actuator or a rotary actuator; and at least two pivot assemblies, including a first pivot assembly configured to pivot the at least one lift fan assembly on a first axis by movement of the first actuator, and a second pivot assembly configured to pivot the at least one lift fan assembly on a second axis substantially perpendicular to the first axis by the movement of the second actuator.

15. The pivotable lift fan assembly of claim 14, the at least one lift fan comprising two lift fans configured to counter-rotate.

16. The pivotable lift fan assembly of claim 14, the gearbox comprising:
an outer enclosure;
an output drive shaft coupled to the at least one lift fan; and
a gearbox assembly within the outer enclosure coupled to the input drive shaft and configured to transfer rotational force of the input drive shaft to rotational force on the output drive shaft.

17. The pivotable lift fan assembly of claim 14, further comprising:
a duct coupled to the input drive shaft and configured to enclose the lift fan assembly, the at least two pivot assemblies coupled to the outside of the duct.

18. The pivotable lift fan assembly of claim 14, further comprising an output drive shaft coupled to the at least one lift fan.

19. The aircraft of claim 18, wherein the output drive shaft is entirely enclosed within the gearbox.

20. An aircraft comprising:
an aircraft housing;
an input drive shaft having a longitudinal axis;
a powerplant coupled to the housing and configured to rotate the input drive shaft around the longitudinal axis thereof;
a single lift fan assembly coupled to the aircraft housing, including a gearbox and at least one lift fan coupled thereto, wherein the input drive shaft is coupled to the gearbox to transfer rotational energy thereto and wherein the fan assembly further includes a first actuator mounted on at least one of a support shaft or the aircraft housing and the first actuator including a linear actuator or a rotary actuator, and the fan assembly further includes a second actuator coupled to the support shaft and mounted to the aircraft housing, the second actuator includes a linear actuator or a rotary actuator; and at least two pivot assemblies, including a first pivot assembly configured to pivot the single lift fan assembly on a first axis by movement of the first actuator, and a second pivot assembly configured to pivot the single lift fan assembly on a second axis substantially perpendicular to the first axis by the movement of the second actuator.

21. The aircraft of claim 20, the aircraft housing comprising:
a fuselage;
a first wing attached to a side of the fuselage; and
a second wing attached to a side of the fuselage opposite the first wing.

22. The aircraft of claim 21, wherein the single lift fan assembly is coupled to the fuselage.

23. The aircraft of claim 20, wherein the powerplant is selected from one of: a turboshaft engine, a turboprop engine, a turbofan engine and an internal combustion engine.

24. The aircraft of claim 20, wherein the aircraft is configured for vertical take off and landing.

25. The aircraft of claim 20, wherein the aircraft is configured for short take off and vertical landing.

26. The aircraft of claim 20, wherein the aircraft is configured for short take off and landing.

27. The aircraft of claim 20, the gearbox comprising:
an outer enclosure;
an output drive shaft coupled to the at least one lift fan; and
a gearbox assembly within the outer enclosure coupled to the input drive shaft and configured to transfer rotational force of the input drive shaft to rotational force on the output drive shaft.

28. The aircraft of claim 20, the single lift fan assembly further comprising:
a duct coupled to the input drive shaft and configured to enclose the single lift fan assembly, the at least two pivot assemblies coupled to the outside of the duct.

29. The aircraft of claim 20, further comprising an output drive shaft coupled to the at least one lift fan.

30. The aircraft of claim 29, wherein the output drive shaft is entirely enclosed within the gearbox.

* * * * *